United States Patent
Ogle et al.

[11] Patent Number: 6,052,736
[45] Date of Patent: Apr. 18, 2000

[54] ADAPTIVE MESSAGE ROUTING IN A MULTIPLE NETWORK ENVIRONMENT WITH A MASTER ROUTER

[75] Inventors: David Mark Ogle, Cary; Karen Marie Tracey, Apex; Barton Clark Vashaw, Apex, all of N.C.

[73] Assignee: International Business Machines Corp., Armonk, N.Y.

[21] Appl. No.: 08/828,686

[22] Filed: Mar. 31, 1997

[51] Int. Cl.[7] .......................... G06F 15/16; G06F 15/173
[52] U.S. Cl. ...................... 709/244; 709/217; 709/241; 370/392
[58] Field of Search ...................... 709/208, 238, 709/241, 243, 244, 217, 218, 219, 223, 224; 370/389, 390, 392, 396, 400, 238

[56] References Cited

U.S. PATENT DOCUMENTS

| | | | |
|---|---|---|---|
| 5,327,426 | 7/1994 | Dolin, Jr. et al. | 370/235 |
| 5,434,863 | 7/1995 | Onishi et al. | 370/402 |
| 5,453,979 | 9/1995 | Schibler et al. | 370/395 |
| 5,613,070 | 3/1997 | Born | 709/253 |
| 5,623,532 | 4/1997 | Houde et al. | 455/445 |
| 5,745,702 | 4/1998 | Morozumi | 709/249 |
| 5,796,732 | 8/1998 | Mazzola et al. | 370/362 |
| 5,802,278 | 9/1998 | Isfeld et al. | 709/249 |
| 5,815,668 | 9/1998 | Hashimoto | 709/238 |
| 5,894,478 | 4/1999 | Barzegar et al. | 370/401 |

OTHER PUBLICATIONS

Comer, Douglas E., "Internetworking with TCP/IP" pp. 90–93, 123–132, and 306–312, 1995.

*Primary Examiner*—Zarni Maung
*Assistant Examiner*—Jason D. Cardone
*Attorney, Agent, or Firm*—Jeanine S. Ray-Yarletts; Myers Bigel Sibley & Sajovec

[57] ABSTRACT

Methods, systems and computer program products are provided which route messages from a source device on a first network to a destination device on a second network through a first routing device where the first routing device transmits a message to a master routing device. The first routing device receives a routing address from the master routing device responsive to the transmitted message. The routing address specifies an address of a device to which subsequent communications to the destination device are routed. The first routing device stores the received routing address in a list of addresses so as to associate the stored routing address with an address of the destination device of the message. The first routing device may also determine a routing address for a second message from the stored list of routing addresses based upon a destination address of the second message and transmit the second message to the determined routing address. The routing table of the routing device may be updated without requiring modification of TCP/IP messages.

40 Claims, 3 Drawing Sheets

ADAPTIVE MESSAGE ROUTING IN A MULTIPLE NETWORK ENVIRONMENT WITH A MASTER ROUTER

FIELD OF THE INVENTION

The present invention relates to local area networks and more particularly to routing of messages between interconnected networks.

BACKGROUND OF THE INVENTION

As the popularity of the Internet has grown so has the number of networks utilizing the Transmission Control Protocol/Internet Protocol (TCP/IP) for inter-processor communications. In fact, the popularity of TCP/IP has led to many internal networks (or intra-nets) being based upon this industry standard. TCP/IP is a connection-less best-efforts protocol which does not utilize any specific predetermined path from a message source to the message destination. One advantage of TCP/IP is that it may be utilized across any number of network architectures. Examples of architectures on which TCP/IP may be used include ethernet, System Network Architecture (SNA), token-ring, AppleTalk or others.

In TCP/IP, messages are typically routed based upon a destination address contained in the message. A message may take any path to the destination which is available. The message may also contain the address of the source of the message but typically does not contain the address of the devices in the path from the source to the destination. These addresses are typically determined by each device in the path based upon the destination address and the paths available. Thus, while the source and the destination of a message may be known, the route the message takes from the source to the destination may not be known.

FIG. 1 illustrates a possible interconnection of networks utilizing TCP/IP. As seen in FIG. 1, a number of TCP/IP networks 10, 12, 14 and 16 are interconnected through routing devices 20, 22, 24 and 26 which are connected through a network 18. When workstation 28 on network 10 sends a TCP/IP message (a "datagram") to a device outside of network 10, routing device 20 forwards the datagram to the network of the destination device.

Routing device 20 forwards the datagram based upon a destination address contained in the datagram by looking up in a routing table the address of the device where the datagram is to be sent. This routing table associates destination addresses with the addresses of accessible devices including routing information to the address provided in the datagram. Thus, in the interconnected networks illustrated in FIG. 1, if the datagram from workstation 28 has a destination address specifying workstation 30, then routing device 20 may direct the datagram to routing device 24 over network 18 which in turn would route the datagram over network 14 to workstation 30.

Each step in the path of the datagram from workstation 28 is commonly referred to as a "hop." A routing table typically specifies the address of the next hop in a datagram's path based upon the destination address of the datagram. Thus, the routing table includes the address of accessible devices to the routing device and the destination addresses which are associated with those accessible devices. Also, while the TCP/IP datagram may contain the source and destination addresses it does not necessarily contain the addresses of the route the datagram takes. Thus, the address of the device from which the previous hop originated may not be known to the next device in the route.

The manner in which a routing table is utilized by a routing device is commonly known as a "routing algorithm." In TCP/IP the routing algorithm is typically a three step process where the first step is to determine from the destination IP address of a datagram whether the address appears among the direct routes (host devices or networks which are accessible to the routing device without going through another routing device) specified in the routing table. If such is the case, then the datagram is sent to the directly attached network device. If the destination address does not specify a direct route, then the routing device determines if an indirect route (a route through a gateway to a device or network not directly accessible to the routing device) is specified for the destination address. If such is the case then the datagram is forwarded to the specified gateway IP address. Finally, if no direct or indirect route is specified then the datagram may be sent to a default address or, if no default address is specified, an error message returned to the source.

The routing tables used by routing devices in TCP/IP networks may be arrived at in a number of ways. In one type of routing, a routing table is broadcast to each routing device from a device which maintains a routing table of all possible routes. In other forms of routing, each routing device builds a routing table via its own dialogue which is called the routing protocol. These tables are then built and maintained by each routing device. In a third form of routing a fixed or static routing table is used for each message routed. Each of these cases has its own disadvantages. For example, the broadcast of a routing table or the routing protocol is typically repeated on a routine basis to assure that the routing device has an accurate routing table thereby using up network bandwidth. The static routing table, while not requiring network bandwidth, may be inefficient in determining the optimal routing path, may require frequent manual intervention or, in a worst case, be unable to adapt to changes in the network topography which make routes unavailable.

With respect to the dynamic routing methods, as the number of interconnected networks and the number of devices connected to those networks increases the size of the routing table, and, therefore, the amount of network resources occupied to maintain the routing table also typically increases. While the increase in resource utilization by an overhead process for establishing a routing table in each routing device may not present problems in many networks, in certain circumstances this overhead may occupy so much of the resources of the network as to cause unacceptable reductions in network performance. For instance, where a large number of TCP/IP networks are interconnect by an any-to-any network, such as an SNA network, the routing table broadcast to each of the routing devices may be so large as to occupy a significant portion of the SNA network's bandwidth. One example of such a network may be a large retail chain where each store in the chain has a TCP/IP network of the cash registers and other workstations located at the store and where each store in the chain is interconnected by an SNA network. In such an example, the any-to-any connectivity of the SNA network may create so large a routing table that the repeated broadcast of routing tables affects network performance.

In view of the above discussion, there exists a need for improvement in the routing of communications through large interconnected networks. In particular, improvements in the distribution and utilization of routing tables are needed so as to improve the performance of highly interconnected networks.

SUMMARY OF THE INVENTION

In view of the above discussion, it is an object of the present invention to provide improved communications between interconnected networks.

A further object of the present invention is to reduce the overhead associated with routing messages between interconnected networks.

Yet another object of the present invention is to provide routing tables to a large number of routing devices with reduced impact on network performance over traditional bridging and routing.

Still another object of the present invention is to provide reduced overhead associated with establishing routing tables utilizing existing TCP/IP protocols.

These and other objects of the present invention are provided by routing messages from a source device on a first network to a destination device on a second network through a first routing device. Messages are first routed by the first routing device transmitting the message to a master routing device. The first routing device then receives a routing address from the master routing device responsive to the transmitted message. The routing address specifies an address of a device to which subsequent communications to the destination device of the message transmitted to the master routing device are routed. The first routing device stores the received routing address in a list of addresses so as to associate the stored routing address with an address of the destination device of the message. The first routing device may also determine a routing address for a second message from the stored list of routing addresses based upon a destination address of the second message and transmit the second message to the determined routing address rather than the address of the master routing device. The message may be a message received by the first routing device and may also be a TCP/IP datagram.

The master routing device receives a message from the first routing device and transmits the message to a routing address determined from a master list of addresses which specifies an address of a device to which communications to the destination device are routed. The master routing device also transmits the routing address to the first routing device.

Thus, the master routing device is used as a default routing path for the first routing device. By updating the address list in the first routing device with the address returned from the master routing device in response to the message, the first routing device may incrementally create a routing table for use in subsequent messages. The need for a broadcast of the complete routing table or a poll of all accessible devices is avoided as each routing device will incrementally create the routing table for the next hop to the destinations used by the devices to which it is connected.

In a further embodiment of the present invention, the master routing device extracts from the message received from the first routing device the address of the first routing device. The master routing device then transmits the routing address to the address of the first routing device.

In a particular embodiment of the present invention, the first network comprises a TCP/IP network and the list of addresses comprises a routing table. In such an embodiment, the first routing device may receive an ICMP redirect message from the master routing device where the ICMP redirect message contains the routing address. The first network and the second network may be connected by an SNA network and the master routing device may also be connected to the SNA network. By using the ICMP message, the routing address may be transmitted to the first routing device using existing TCP/IP protocols. Furthermore, because of the source and destination information available in an SNA network as to the immediate source of the last hop, the master device may readily obtain the address of the first routing device with existing SNA capabilities.

As will be appreciated by those of skill in the art, the present invention contemplates a master routing function, a routing device function and a system incorporating both a master routing function and a routing function. As will further be appreciated by those of skill in the art, the present invention may be embodied as a method, apparatus or computer program product.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

Figure 1:
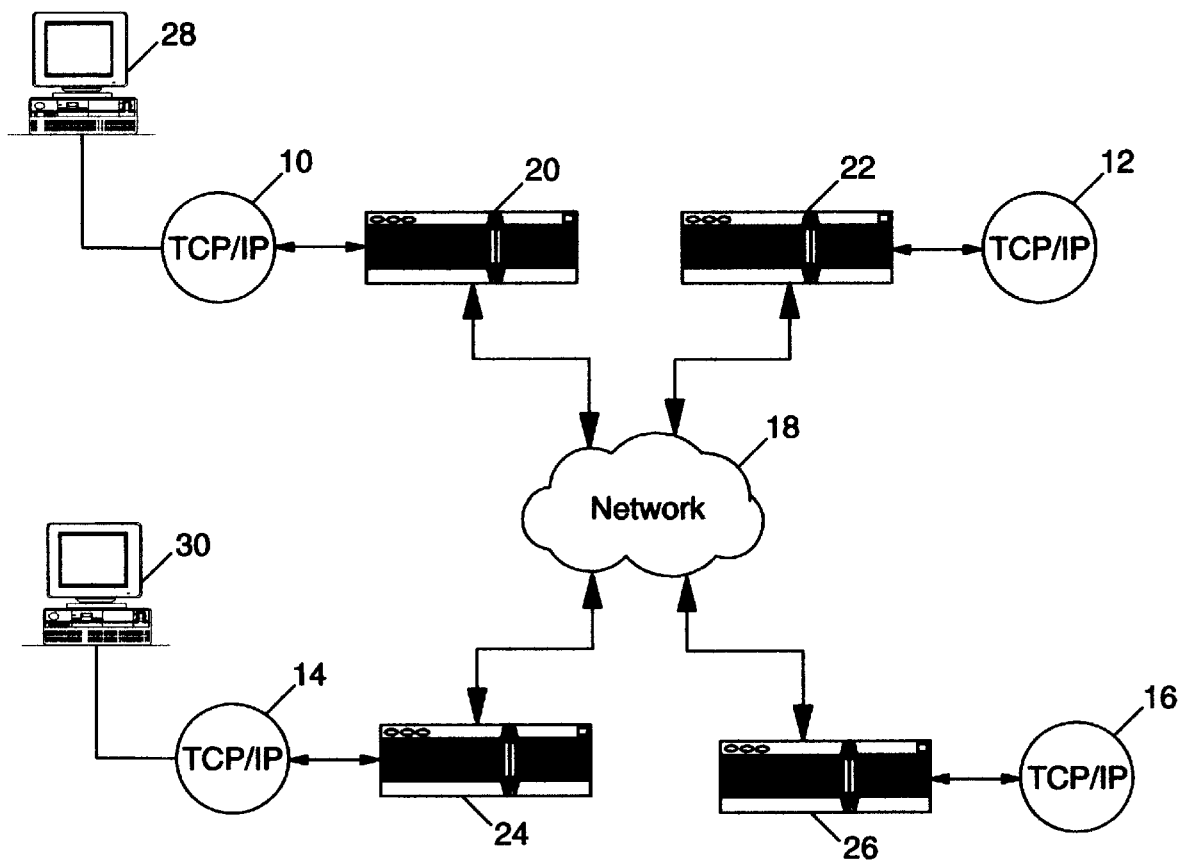
FIG. 1 is a block diagram of multiple interconnected networks.

FIG. 1 illustrates a network configuration which may utilize the present invention. As will be appreciated by those of skill in the art, the present invention is not intended to be limited to network configurations such as is illustrated in FIG. 1 but may be utilized in any number of other network configurations.

FIG. 1 illustrates a number of TCP/IP networks (10, 12, 14 and 16) which are interconnected by network 18. Network 18 is preferably an any-to-any network such as an SNA network. While four TCP/IP networks are illustrated in FIG. 1, the present invention may be utilized with any number of interconnected networks. Similarly, while network 18 is illustrated as a single network, it may be a network of networks.

According to the present invention, at least one routing device accessible to network 18 is a master routing device. For illustrative purposes, routing device 22 in FIG. 1 will be discussed as carrying out the function of a master routing device. The master routing device 22 preferably has access to a routing table which describes the routes to all of the devices accessible through network 18 and the networks connected to network 18. While master routing device 22 preferably contains a complete routing table, a partial table may be utilized while still benefiting from the teachings of the present invention. Furthermore, multiple master devices can be utilized with each master having a complete or partial routing table.

Other routing devices (20, 24 and 26) are also connected to network 18 and provide accessibility to the associated networks (10, 14, and 16). When a message is originated by, for example, workstation 28, the message contains a destination address, such as the address of workstation 30. This message would be received by routing device 20 and, based on the destination address, would be routed to the master routing device 22. The master routing device 22 would then route the message to routing device 24 which would then route the message to workstation 30. Master routing device 22 would also send a message containing a routing address to routing device 20. Thus, a message would be sent to routing device 20 which contained the address of routing device 24. The routing address would be associated with the destination address of workstation 30. The routing device 20 would then update its routing table to indicate that messages to workstation 30 should be routed directly to routing device 24 rather than to master routing device 22.

In the TCP/IP context, the message generated by workstation 28 may be a TCP/IP datagram and the message returned to routing device 20 may be an Internet Control Message Protocol (ICMP) redirect message. Thus, existing TCP/IP messages may be utilized to dynamically update the routing tables in the routing devices 20, 24 and 26.

As will be understood by those of skill in the art, any number of network architectures may be utilized or modified to function in conjunction with the present invention. However, in the TCP/IP environment, the master routing device would not typically know the address of the routing device from which it received a message unless that routing device also originated the message. Thus, the network 18 must provide a way for the master routing device 22 to determine the address of the device which originated the hop to the master routing device. Such a determination may be readily made if, for example, the network is an SNA network because SNA messages may contain the address information of the device transmitting the message.

Through the use of the present invention, the overhead associated with the creation of a routing table for use by a routing device interconnected with a number of routing devices by an any-to-any network may be reduced. The iterative creation of the routing table eliminates the need to broadcast a routing table to the routing devices and eliminates superfluous procedures to construct a routing table which includes routes which are not utilized by a routing device and procedures to periodically maintain a complete routing table. The fact that the first message may not utilize the shortest route to a destination may be more than made up for by decreases in network utilization associated with the adaptive creation of a routing table at each routing device connected to network 18.

The present invention will now be described with respect to FIG. 2 and FIG. 3 which are flowcharts illustrating the operation of a routing device and a master routing device utilizing the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

Figure 2:
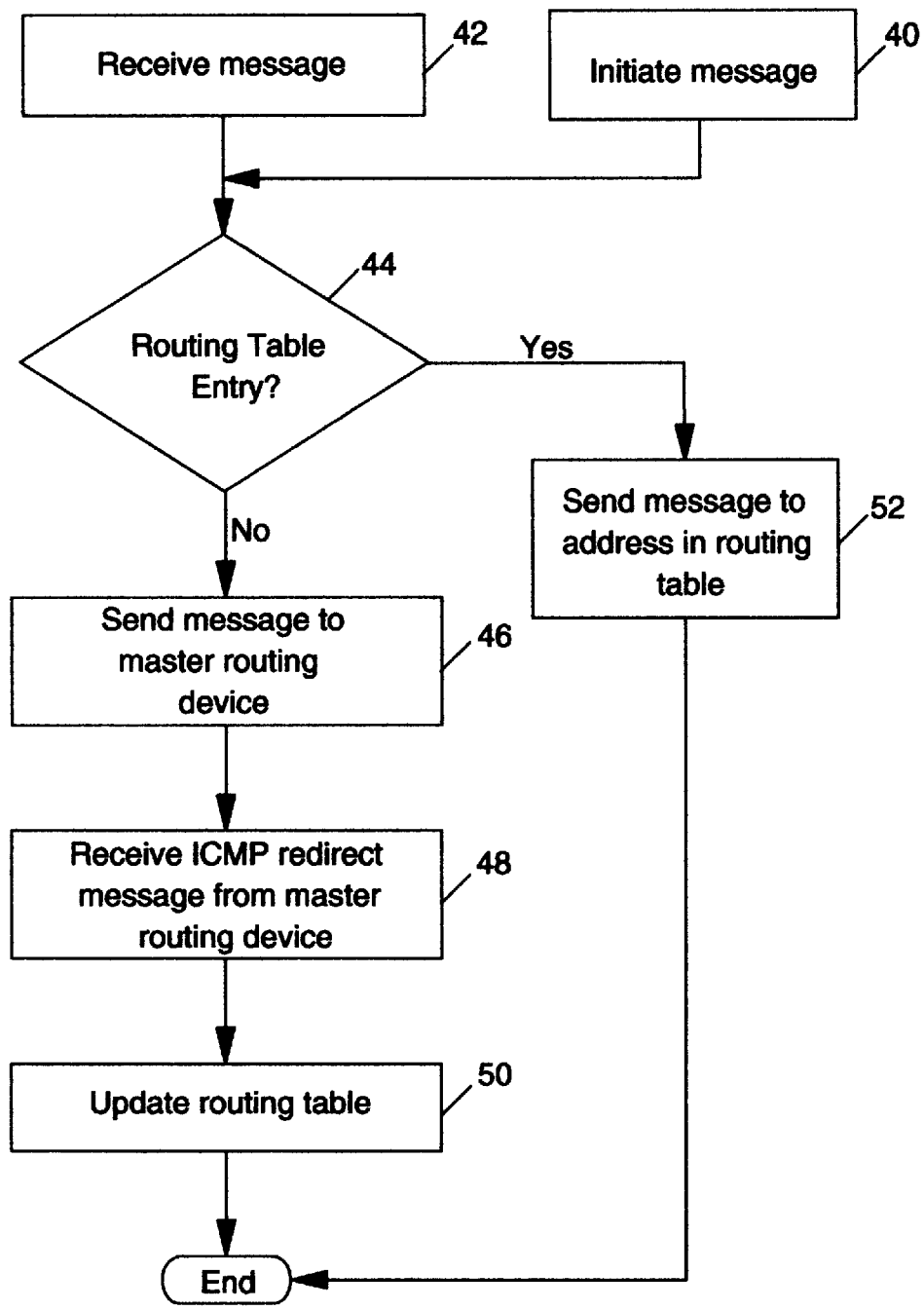
FIG. 2 is a flowchart of a routing function according to the present invention.

FIG. 2 illustrates the operation of a routing device utilizing the present invention. As seen in FIG. 2 a routing device such as routing device 20 may either originate a message (block 40), such as a TCP/IP datagram, or may receive a message (block 42) to be routed. In either case, the routing device 20 utilizes its routing algorithm to determine if a routing table entry corresponding to the destination address of the message exists (block 44). If a routing table entry does not exist, the routing device 20 routes the message to the master routing device 22 (block 46). The routing device 20 then receives an ICMP redirect message from the master routing device 22 which contains the address to be associated with the destination address of the message sent (block 48) for use with future messages to that destination address. The routing device 20 utilizes the received routing address to update the routing table to create an entry associated with the destination address of the message in a list of address of routes (block 50). Having completed the routing of the message, the routing function ends until another message is either generated or received.

If the routing device 20 determines that a routing table entry exists corresponding to the destination address of the generated or received message (block 44) then the routing device 20 utilizes the address from the routing table to route the message (block 52). Thus, for example, if an ICMP redirect message is received in response to a message sent from a routing device 20 to the master routing device 22, then the routing device 20 would utilize the address in that ICMP redirect as the routing address for all subsequent messages to the destination address of the message to which the ICMP redirect message is responsive. This is accomplished by the update procedure described above and illustrated in block 50.

Figure 3:
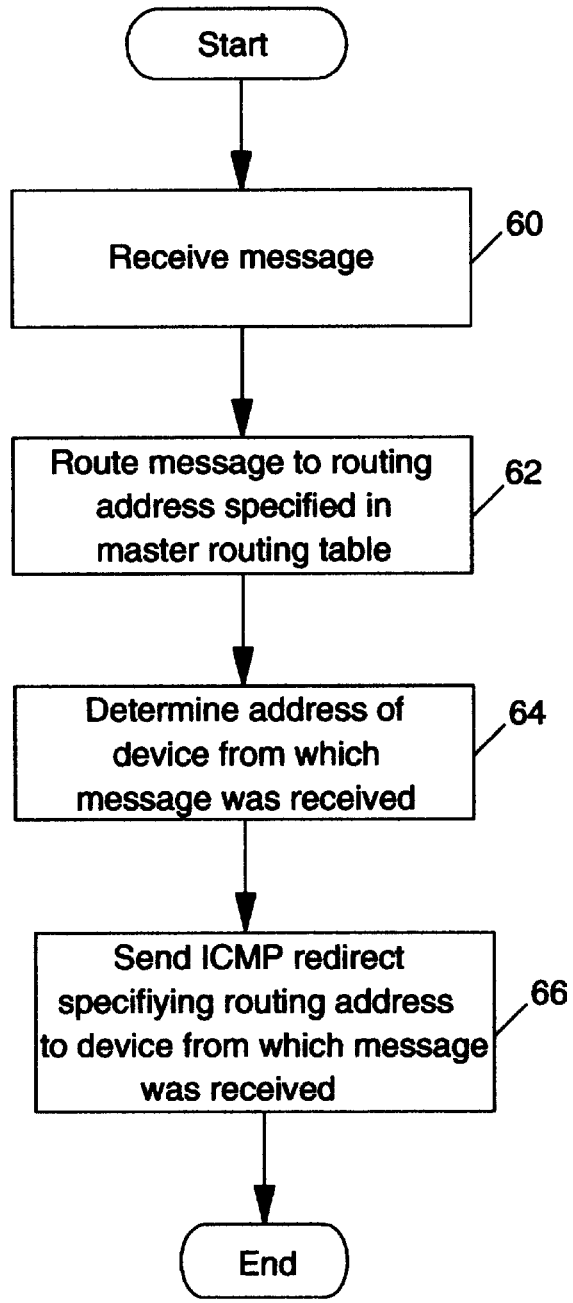
FIG. 3 is a flow chart of a master routing function according to the present invention.

FIG. 3 illustrates the operation of a master routing device 22 according to the present invention. As seen in FIG. 3, the master routing device 22 receives a message (block 60) and then routes the received message to the address specified in a master routing table maintained by the master routing device 22 (block 62). The master routing device 22 then determines the address from which the message was received (block 64). An ICMP redirect message is then sent to the device from which the message was received which specifies the address to which the message was routed (block 66) and then ends.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of routing messages from a source device on a first network to a destination device on a second network through a first routing device utilizing a master routing device remote from the first routing device, the method comprising the steps of:

transmitting a message received at the first routing device to a master routing address associated with the master routing device over a third network;

receiving a routing address from the master routing device responsive to the transmitted message, wherein the received routing address specifies an address of a device to which subsequent communications to the destination device are routed;

storing, at the first routing device, the received routing address in a list of addresses so as to associate the stored routing address with an address of the destination device of the message;

receiving at the master routing device [a] the received message transmitted from the first routing device over the third network;

transmitting the message received at the master routing device to a routing address determined from a master list of addresses which specifies an address of a device to which communications to the destination device are routed; and transmitting the routing address determined from the master list of addresses from the master routing device to the first routing device.

2. A method according to claim 1 wherein the first network comprises a TCP/IP network and wherein the list of addresses comprises a routing table.

3. A method according to claim 2 wherein said step of receiving a routing address comprises the step of receiving an ICMP redirect message from the master routing device.

4. A method according to claim 2 wherein said message comprises a TCP/IP datagram.

5. A method according to claim 2 wherein said transmitting the routing address step comprises the step of transmitting to the first routing device an ICMP redirect message.

6. A method according to claim 2 wherein the first network and the second network are connected by an SNA network and wherein the master routing device is connected to the SNA network.

7. A method according to claim 1 wherein the first routing device further carries out the steps:

determining a routing address for a second message from the stored list of routing addresses based upon a destination address of the second message; and transmitting the second message to the determined routing address.

8. A method according to claim 1 wherein said step of transmitting the routing address comprises the steps of:

extracting from the received message the address of the first routing device; and transmitting the routing address to the address of the first routing device.

9. A method according to claim 1 wherein said first routing device further carries out the step of receiving a message to be routed to the destination device.

10. A method of routing messages from a source device on a first network to a destination device on a second network utilizing a master routing device which is remote from the first routing device, the method comprising the steps of:

transmitting a received message to a master routing address associated with the master routing device over a third network;

receiving a routing address over the third network from the master routing device responsive to the transmitted message, wherein the received routing address specifies an address of a device to which subsequent communications to the destination device are routed; and storing the received routing address in a list of addresses so as to associate the stored routing address with an address of the destination device of the message.

11. A method according to claim 10 wherein the first network comprises a TCP/IP network and wherein the list of addresses comprises a routing table.

12. A method according to claim 11 wherein said receiving step comprises the step of receiving an ICMP redirect message from the master routing device.

13. A method according to claim 11 wherein said message comprises a TCP/IP datagram.

14. A method according to claim 11 wherein the first network and the second network are connected by an SNA network and wherein the master routing device is connected to the SNA network.

15. A method according to claim 10 further comprising the steps of:

determining a routing address for a second message from the stored list of routing addresses based upon a destination address of the second message; and transmitting the second message to the determined routing address.

16. A method according to claim 10 further comprising the step of receiving a message to be routed to the destination device.

17. A method of routing messages from a source device on a first network to a destination device on a second network, the method comprising the steps of:

receiving a message to be transmitted to the destination device at a device remote from a device from which the message was received;

transmitting the message to a routing address determined from a master list of addresses which specifies an address of a device to which communications to the destination device are routed; and transmitting, responsive to receiving the message to be transmitted to the destination device, the determined routing address to the device from which the message was received.

18. A method according to claim 17 wherein the first network and the second network comprise TCP/IP networks and wherein said step of transmitting the determined routing address comprises transmitting the routing address as an ICMP redirect message.

19. A method according to claim 18 wherein the first and second networks are connected by an SNA network and wherein said step of receiving a message comprises the step of receiving a message addressed to a master routing device connected to the SNA network.

20. A method according to claim 18 wherein said step of transmitting the routing address comprises the steps of:

extracting from the received message the address of the device connected to the SNA network from which the message was received; and transmitting the routing address to the address of the device connected to the SNA network from which the message was received.

21. A system for routing messages from a source device on a first network to a destination device on a second network, the system comprising:

means for transmitting a message from a first routing device to a master routing address associated with a master routing device wherein the master routing device is remote from the first routing device;

means for receiving at the first routing device a routing address from the master routing device responsive to the transmitted message, wherein the routing address specifies an address of a device to which subsequent communications to the destination device are routed; and means for storing the received routing address at the first routing device in a list of addresses so as to associate the stored routing address with an address of the destination device of the message.

22. A system according to claim 21 wherein the first network comprises a TCP/IP network and wherein the list of address comprises a routing table.

23. A system according to claim 22 wherein said means for receiving comprises means for receiving an ICMP redirect message from the master routing device.

24. A system according to claim 22 wherein said means for receiving comprises means for receiving a TCP/IP datagram.

25. A system according to claim 21 further comprising:
means for determining a routing address for a second message from the stored list of routing addresses based upon a destination address of the second message; and
means for transmitting the second message to the determined routing address.

26. A system according to claim 21 further comprising means for receiving a message to be routed to the destination device.

27. A system for routing messages from a source device on a first network to a destination device on a second network, the system comprising:
means for receiving a message from a first routing device at a master routing device remote from the first routing device;
means for transmitting the message to a routing address determined from a master list of addresses which specifies an address of a device to which communications to the destination device are routed;
means for transmitting the determined routing address to the first routing device from which the message was received.

28. A system according to claim 27 wherein the first network and the second network comprise TCP/IP networks and wherein said means for transmitting the determined routing address comprises means for transmitting the routing address as an ICMP redirect message.

29. A system according to claim 27 wherein the first and second networks are connected by an SNA network and wherein said means for receiving a message comprises means for receiving a message addressed to a master routing device connected to the SNA network.

30. A system according to claim 27 wherein said means for transmitting the determined routing address comprises:
means for extracting from the received message the address of the device connected to the SNA network from which the message was received; and
means for transmitting the determined routing address to the address of the device connected to the SNA network from which the message was received.

31. A computer program product for routing messages from a source device on a first network to a destination device on a second network, the computer program product comprising:
a computer-readable storage medium having computer-readable program code means embodied in said medium, said computer-readable program code means comprising:
computer-readable program code means for transmitting a message from a first routing device to a master routing address associated with a master routing device which is remote from the first routing device;
computer-readable program code means for receiving at the first routing device a routing address from the master routing device responsive to the transmitted message, wherein the routing address specifies an address of a device to which subsequent communications to the destination device are routed; and
computer-readable program code means for storing the received routing address at the first routing device in a list of addresses so as to associate the stored routing address with an address of the destination device of the message.

32. A computer program product according to claim 31 wherein the first network comprises a TCP/IP network and wherein the list of address comprises a routing table.

33. A computer program product according to claim 32 wherein said computer-readable program code means for receiving comprises computer-readable program code means for receiving an ICMP redirect message from the master routing device.

34. A computer program product according to claim 32 wherein said computer-readable program code means for receiving comprises computer-readable program code means for receiving a TCP/IP datagram.

35. A computer program product according to claim 31 further comprising:
computer-readable program code means for determining a routing address for a second message from the stored list of routing addresses based upon a destination address of the second message; and
computer-readable program code means for transmitting the second message to the determined routing address.

36. A computer program product according to claim 31 further comprising computer-readable program code means for receiving a message to be routed to the destination device.

37. A computer program product for routing messages from a source device on a first network to a destination device on a second network, the computer program product comprising:
a computer-readable storage medium having computer-readable program code means embodied in said medium, said computer-readable program code means comprising:
computer-readable program code means for receiving a message transmitted from a first routing device to a master routing device remote from the first routing device;
computer-readable program code means for transmitting the message to a routing address determined from a master list of addresses which specifies an address of a device to which communications to the destination device are routed; and
computer-readable program code means for transmitting the determined routing address to the first routing device from which the message was received.

38. A computer program product according to claim 37 wherein the first network and the second network comprise TCP/IP networks and wherein said computer-readable program code means for transmitting the determined routing address comprises computer-readable program code means for transmitting the routing address as an ICMP redirect message.

39. A computer program product according to claim 37 wherein the first and second networks are connected by an SNA network and wherein said computer-readable program code means for receiving a message comprises computer-readable program code means for receiving a message addressed to a master routing device connected to the SNA network.

40. A computer program product according to claim 37 wherein said computer-readable program code means for transmitting the determined routing address comprises:

computer-readable program code means for extracting from the received message the address of the device connected to the SNA network from which the message was received; and computer-readable program code means for transmitting the determined routing address to the address of the device connected to the SNA network from which the message was received.

* * * * *